United States Patent
Dodd-Noble et al.

(10) Patent No.: US 10,285,155 B1
(45) Date of Patent: May 7, 2019

(54) PROVIDING USER EQUIPMENT LOCATION INFORMATION INDICATION ON USER PLANE

(71) Applicant: Cisco Technology, Inc., San Jose, CA (US)

(72) Inventors: Aeneas Sean Dodd-Noble, Andover, MA (US); Pablo Camarillo Garvia, Madrid (ES); Om Prakash Suthar, Bolingbrook, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/140,255

(22) Filed: Sep. 24, 2018

(51) Int. Cl.
| | |
|---|---|
| *H04W 64/00* | (2009.01) |
| *H04W 4/029* | (2018.01) |
| *H04W 24/10* | (2009.01) |
| *H04L 12/26* | (2006.01) |
| *H04W 8/24* | (2009.01) |

(52) U.S. Cl.
CPC ......... *H04W 64/003* (2013.01); *H04L 43/062* (2013.01); *H04W 4/029* (2018.02); *H04W 8/24* (2013.01); *H04W 24/10* (2013.01); *H04L 2212/00* (2013.01)

(58) Field of Classification Search
CPC ......... H04L 69/16; H04L 69/22; H04L 45/34; H04W 80/04
USPC ........ 455/414.1, 456.1, 456.3; 370/242, 331, 370/338
See application file for complete search history.

(56) References Cited

U.S. PATENT DOCUMENTS

| | | | |
|---|---|---|---|
| 4,236,068 | A | 11/1980 | Walton |
| 5,642,303 | A | 6/1997 | Small et al. |
| 5,751,223 | A | 5/1998 | Turner |
| 6,812,824 | B1 | 11/2004 | Goldinger et al. |
| D552,603 | S | 10/2007 | Tierney |
| 7,573,862 | B2 | 8/2009 | Chambers et al. |

(Continued)

FOREIGN PATENT DOCUMENTS

| | | |
|---|---|---|
| WO | WO 2013/020126 | 2/2013 |
| WO | WO 2014/098556 | 6/2014 |

(Continued)

OTHER PUBLICATIONS

"Cisco ASR 5x00 Mobility Management Entity Administration Guide," Version 15.0, Cisco Systems, Inc., Last updated Jun. 13, 2014, pp. 1-266.

(Continued)

*Primary Examiner* — Sam Bhattacharya
(74) *Attorney, Agent, or Firm* — Polsinelli PC

(57) ABSTRACT

Aspects of the disclosed technology provide ways to report User Equipment (UE) device locations in a 5G network for the purpose of redirecting application traffic from proximately located Data Networks (DNs). In one aspect, the disclosed technology encompasses a process for conveying User Equipment (UE) information to an Application Function (AF), the process includes steps for receiving, at an intermediate-User Plane Function (I-UPF) entity, User Equipment (UE) uplink data from a Radio Access Network (RAN), determining if sharing of location information or application information associated with the UE is restricted, and encapsulating first location metadata or application metadata in an SRv6 packet if the sharing of location information or application information is not restricted. Systems and machine-readable media are also provided.

20 Claims, 5 Drawing Sheets

(56) References Cited

U.S. PATENT DOCUMENTS

| | | |
|---|---|---|
| D637,569 S | 5/2011 | Desai et al. |
| 7,975,262 B2 | 7/2011 | Cozmei |
| 8,010,079 B2 | 8/2011 | Mia et al. |
| 8,102,814 B2 | 1/2012 | Rahman et al. |
| 8,260,320 B2 | 9/2012 | Herz |
| 8,284,748 B2 | 10/2012 | Borghei |
| 8,300,594 B1 | 10/2012 | Bernier et al. |
| 8,325,626 B2 | 12/2012 | Tóth et al. |
| 8,396,485 B2 | 3/2013 | Grainger et al. |
| 8,446,899 B2 | 5/2013 | Lei et al. |
| 8,457,145 B2 | 6/2013 | Zimmerman et al. |
| 8,458,184 B2 | 6/2013 | Dorogusker et al. |
| D691,636 S | 10/2013 | Bunton |
| 8,549,638 B2 | 10/2013 | Aziz |
| 8,553,634 B2 | 10/2013 | Chun et al. |
| 8,644,301 B2 | 2/2014 | Tamhankar et al. |
| 8,650,279 B2 | 2/2014 | Mehta et al. |
| 8,669,902 B2 | 3/2014 | Pandey et al. |
| 8,676,182 B2 | 3/2014 | Bell et al. |
| 8,682,279 B2 | 3/2014 | Rudolf et al. |
| 8,693,367 B2 | 4/2014 | Chowdhury et al. |
| 8,718,644 B2 | 5/2014 | Thomas et al. |
| 8,761,174 B2 | 6/2014 | Jing et al. |
| 8,768,389 B2 | 7/2014 | Nenner et al. |
| 8,849,283 B2 | 9/2014 | Rudolf et al. |
| 8,909,698 B2 | 12/2014 | Parmar et al. |
| 8,958,318 B1 | 2/2015 | Hastwell et al. |
| 9,060,352 B2 | 6/2015 | Chan et al. |
| 9,130,859 B1 | 9/2015 | Knappe |
| 9,173,084 B1 | 10/2015 | Foskett |
| 9,173,158 B2 | 10/2015 | Varma |
| D744,464 S | 12/2015 | Snyder et al. |
| 9,270,709 B2 | 2/2016 | Shatzkamer et al. |
| 9,271,216 B2 | 2/2016 | Friman et al. |
| 9,281,955 B2 | 3/2016 | Moreno et al. |
| D757,424 S | 5/2016 | Phillips et al. |
| D759,639 S | 6/2016 | Moon et al. |
| 9,369,387 B2 | 6/2016 | Filsfils et al. |
| 9,389,992 B2 | 7/2016 | Gataullin et al. |
| 9,426,305 B2 | 8/2016 | De Foy et al. |
| D767,548 S | 9/2016 | Snyder et al. |
| 9,467,918 B1 | 10/2016 | Kwan |
| D776,634 S | 1/2017 | Lee et al. |
| 9,544,337 B2 | 1/2017 | Eswara et al. |
| 9,569,771 B2 | 2/2017 | Lesavich et al. |
| 9,609,504 B2 | 3/2017 | Karlqvist et al. |
| 9,615,268 B2 | 4/2017 | Navarro et al. |
| 9,634,952 B2 | 4/2017 | Gopinathan et al. |
| 9,642,167 B1 | 5/2017 | Snyder et al. |
| 9,654,344 B2 | 5/2017 | Chan et al. |
| 9,712,444 B1 | 7/2017 | Bolshinsky et al. |
| 9,713,114 B2 | 7/2017 | Yu |
| 9,736,056 B2 | 8/2017 | Vasseur et al. |
| 9,762,683 B2 | 9/2017 | Karampurwala et al. |
| 9,772,927 B2 | 9/2017 | Gounares et al. |
| 9,820,105 B2 | 11/2017 | Snyder et al. |
| D804,450 S | 12/2017 | Spiel et al. |
| 9,858,559 B2 | 1/2018 | Raleigh et al. |
| 9,860,151 B2 | 1/2018 | Ganichev et al. |
| 9,933,224 B2 | 2/2018 | Dumitriu et al. |
| 9,923,780 B2 | 3/2018 | Rao et al. |
| 9,961,560 B2 | 5/2018 | Farkas et al. |
| 9,967,906 B2 | 5/2018 | Verkaik et al. |
| 9,980,220 B2 | 5/2018 | Snyder et al. |
| 9,985,837 B2 | 5/2018 | Rao et al. |
| 9,998,368 B2 | 6/2018 | Chen et al. |
| 2003/0087645 A1 | 5/2003 | Kim et al. |
| 2003/0116634 A1 | 6/2003 | Tanaka |
| 2004/0203572 A1 | 10/2004 | Aerrabotu et al. |
| 2005/0090225 A1 | 4/2005 | Muehleisen et al. |
| 2005/0169193 A1 | 8/2005 | Black et al. |
| 2005/0186904 A1 | 8/2005 | Kowalski et al. |
| 2006/0022815 A1 | 2/2006 | Fischer et al. |
| 2006/0030290 A1 | 2/2006 | Rudolf et al. |
| 2006/0092964 A1 | 5/2006 | Park et al. |
| 2006/0126882 A1 | 6/2006 | Deng et al. |
| 2006/0187866 A1 | 8/2006 | Werb et al. |
| 2007/0037605 A1 | 2/2007 | Logan |
| 2007/0239854 A1 | 10/2007 | Janakiraman et al. |
| 2008/0037715 A1 | 2/2008 | Prozeniuk et al. |
| 2008/0084888 A1 | 4/2008 | Yadav et al. |
| 2008/0101381 A1 | 5/2008 | Sun et al. |
| 2008/0163207 A1 | 7/2008 | Reumann et al. |
| 2008/0233969 A1 | 9/2008 | Mergen |
| 2009/0129389 A1 | 5/2009 | Halna DeFretay et al. |
| 2009/0203370 A1 | 8/2009 | Giles et al. |
| 2009/0282048 A1 | 11/2009 | Ransom et al. |
| 2009/0298511 A1 | 12/2009 | Paulson |
| 2009/0307485 A1 | 12/2009 | Weniger et al. |
| 2010/0039280 A1 | 2/2010 | Holm et al. |
| 2010/0097969 A1 | 4/2010 | De Kimpe et al. |
| 2011/0087799 A1 | 4/2011 | Padhye et al. |
| 2011/0142053 A1 | 6/2011 | Van Der Merwe et al. |
| 2011/0182295 A1 | 7/2011 | Singh et al. |
| 2011/0194553 A1 | 8/2011 | Sahin et al. |
| 2011/0228779 A1 | 9/2011 | Goergen |
| 2012/0023552 A1 | 1/2012 | Brown et al. |
| 2012/0054367 A1 | 3/2012 | Ramakrishnan et al. |
| 2012/0088476 A1 | 4/2012 | Greenfield |
| 2012/0115512 A1 | 5/2012 | Grainger et al. |
| 2012/0157126 A1 | 6/2012 | Rekimoto |
| 2012/0167207 A1 | 6/2012 | Beckley et al. |
| 2012/0182147 A1 | 7/2012 | Forster |
| 2012/0311127 A1 | 12/2012 | Kandula et al. |
| 2012/0324035 A1 | 12/2012 | Cantu et al. |
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | A K et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |

(56) References Cited

U.S. PATENT DOCUMENTS

| | | |
|---|---|---|
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0273083 A1 | 9/2017 | Chen et al. |
| 2017/0317997 A1 | 11/2017 | Smith et al. |
| 2017/0332421 A1 | 11/2017 | Sternberg et al. |
| 2017/0339706 A1 | 11/2017 | Andreoli-Fang et al. |
| 2018/0063018 A1 | 3/2018 | Bosch et al. |
| 2018/0069311 A1 | 3/2018 | Pallas et al. |
| 2018/0084389 A1 | 3/2018 | Snyder et al. |

FOREIGN PATENT DOCUMENTS

| | | |
|---|---|---|
| WO | WO 2015/131920 | 9/2015 |
| WO | WO 2017/078657 | 5/2017 |
| WO | 2017/187011 | 11/2017 |
| WO | WO 2018/009340 | 1/2018 |
| WO | WO 2018/028777 | 2/2018 |
| WO | WO 2018/053271 | 3/2018 |
| WO | WO 2018/066362 | 4/2018 |

OTHER PUBLICATIONS

"Cisco 10000 Series Router Quality of Service Configuration Guide, Chapter 20: Configuring Quality of Service for MPLS Traffic," Cisco Systems, Inc., Updated Nov. 17, 2013, pp. 1-34.

"Enterprise Mobility 7.3 Design Guide, Chapter 11: CISCO Mobility Services Engine," Cisco Systems, Inc., Updated Apr. 20, 2015, 8 pages.

"I Love WiFi, The difference between L2 and L3 Roaming Events," Apr. 1, 2010, 6 pages.

"Quality of Service Regulation Manual," ITU 2017, pp. 1-174.

"Wi-FI Location-Based Services 4.1 Design Guide," May 20, 2008, 206 pages.

Afolabi, Ibrahim, et al., "Network Slicing & Softwarization: A Survey on Principles, Enabling Technologies & Solutions," Mar. 21, 2018, pp. 1-24.

Ali, Z., et al., "Performance Measurement in Segment Routing Networks with IPv6 Data Plane (SRv6)," Spring Working Group, Feb. 26, 2018, pp. 1-17.

An, Xueli, et al., "Virtualization of Cellular Network EPC Gateways based on a Scalable SDN Architecture," IEEE, Feb. 12, 2015, pp. 1-7.

Antonioli, Roberto, et al., "Dual Connectivity for LTE-NR Cellular Networks," Research Gate, Sep. 3-6, 2017, pp. 171-175.

Bekan, Adnan, et al., "D5.1: Machine Learning Algorithms Development and Implementation," 2016-2018 eWINE Consortium, 23, 2016, pp. 1-72.

Bogale, Tadilo Endeshaw, et al., "Machine Intelligence Techniques for Next-Generation Context-Aware Wireless Networks," arxiv.org, Jan. 12, 2018, pp. 1-10.

Carter, Steve Sr., "E911 VoIP Essentials for Enterprise Deployments," XO Communications, LLC, 2012, 9 pages.

Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.

Cheng, W., et al., "Path Segment in MPLS Based Sement Routing Network," Network Working Group, Oct. 2017, pp. 1-10.

Christidis, Konstantinos, et al., "Blockchains and Smart Contracts for the Internet of Things," IEEE Access, Special Section on the of Research in Internet of Things (IoT), vol. 4, May 10, 2016, pp. 1-12.

Cox, Jacob H. Jr., et al., "Advancing Software-Defined Networks: A Survey," IEEE, Oct. 12, 2017, pp. 25487-25526.

Cui, Wenzhi et al., "DiFS: Distributed Flow Scheduling for Data Center Networks," Nanjing University, China, Jul. 28, 2013, 10 pages.

Doyle, Matthew G., "An IP Address Management Solution for a Server Solution Provider," A Dissertation Submitted to the University of Liverpool, Sep. 28, 2005, 116 pages.

Galvan T., Carlos E., et al., "Wifi bluetooth based combined positioning algorithm," International Meeting of Electrical Engineering Research ENIINVIE 2012, Procedia Engineering 35 (2012 ), pp. 101-108.

Geller, Michael, et al. , "5G Security Innovation with Cisco," Whitepaper Cisco Public, Jun. 8, 2018, pp. 1-29.

Gesbert, David, "Advances in Multiuser MIMO Systems (Tutorial Part II) Emerging Topics in Multiuser MIMO Networks," IEEE PIMRC Conference, Sep. 2007, 107 pages.

Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.

Herb, Daniel, et al., "ROAUM: How to Unblock Roaming IoT Using BLockchain," available at https://uploads-ssl.webflow.com/5987a08baeea4300016b7bd9/5a7a6d6cee5bc400010a08f2_Roaum_Roaming_IoT_Whitepaper.pdf, pp. 1-14.

Hsieh, Cynthia, "Location Awareness in VMware View 4.5 and Above," VMware, 2011, 8 pages.

Jero, Samuel, et al., "Identifier Binding Attacks and Defenses in Software-Defined Networks," USENIX, The Advanced Computing Systems Association, Aug. 16-18, 2017, 19 pages.

Ji, Philip N., et al., "Demonstration of High-Speed MIMO OFDM Flexible Bandwidth Data Center Network," Optical Society of America, 2012, 2 pages.

Kandula, Srikanth, et al., "Flyways to De-Congest Data Center Networks," Microsoft Research, Oct. 23, 2009, 6 pages.

Katayama, Y. et al., "MIMO Link Design Strategy for Wireless Data Center Applications," IEEE Wireless Communications and Networking Conference: Services, Applications, and Business, 2012, 5 pages.

Leary, Jonathan, et al., "Wireless LAN Fundamentals: Mobility," Jan. 9, 2004, Cisco Press, 15 pages.

Leonhardt, Ulf, "Supporting Location-Awareness in Open Distributed Systems," May 1998, 186 pages.

Morozov, Yury, "Blockchain Telecom: Bubbletone Blockchain," Dec. 29, 2017, pp. 1-33.

Network Heresy, "NVGRE, VXLAN and What Microsoft is Doing Right," Oct. 3, 2011, 5 pages.

Norwegian National Security Authority, "N-03 Security guidance for switches and routers," Sep. 26, 2012, pp. 1-24.

Saraiva de Sousa, Nathan F., et al., "Network Service Orchestration: A Survey," IEEE Communications Surveys & Tutorials, Mar. 23, 2018, pp. 1-30.

Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

Shwetha, D., et al.,"A Bandwidth Request Mechanism for QoS Enhancement in Mobile WiMAX Networks," International Journal of Advanced Research in Electrical Electronics and Instrumentation Engineering, vol. 3, Issue 1, Jan. 2014, pp. 1-8.

Sun, et al., "The future of Wi-Fi," IEEE Communications Magazine, vol. 52, No. 11, Nov. 21, 2014, 166 pages.

(56) References Cited

OTHER PUBLICATIONS

Ventre, Pier Luigi, et al., "Performance Evaluation and Tuning of Virtual Infrastructure Managers for (Micro) Virtual Network Functions," ieee.org, Nov. 7-10, 2016, pp. 1-7.

Wright, Joshua, "Detecting Wireless LAN MAC Address Spoofing," Jan. 21, 2003, pp. 1-20.

Zickau, Sebastian, et al., "Enabling Location-based Policies in a Healthcare Cloud Computing Environment," 2014 IEEE $3^{rd}$ International Conference on Cloud Networking (Cloudnet), Oct. 2014, pp. 353-358.

Husain et al., "Mobile Edge Computing with Network Resource Slicing for Internet-of-Things," IEEE 2017, pp. 1-7.

PROVIDING USER EQUIPMENT LOCATION INFORMATION INDICATION ON USER PLANE

TECHNICAL FIELD

The disclosed technology relates to solutions for identifying User Equipment (UE) locations in a wireless network and in particular, for identifying UE locations based on radio location information that is encapsulated in SRv6 packet headers for location reporting in a 5G network.

BACKGROUND

An ever-increasing consumer demand, improved technological advancements (e.g., hardware/software infrastructure), and industry collaboration has driven significant growth in modern telecommunication networks and continues to drive its evolution. Indeed, each iteration or "next generation" of network capabilities, e.g., represented by standards promulgated by a Third Generation Partnership Project (3GPP), interconnects more devices, improves network bandwidth, increases data-rates, and so on. For example, a transition from $3^{rd}$ Generation (3G) networks to $4^{th}$ Generation (4G) networks introduced new network services and connected mobile devices to third party data networks such as the Internet. More recently, a transition is underway from existing 4G networks to new 5G networks, which includes a new service-oriented architecture for provisioning network services/resources in a dynamic, scalable, and customizable fashion (e.g., micro-services, network functions virtualization (NFV), etc.). For example, this service-oriented architecture supports network slices, which employ an isolated set of programmable resources that can implement individual network functions and/or application services through software programs within a respective network slice, without interfering with other functions and services on coexisting network slices. In turn, the service-oriented architecture, including its network slice support, creates opportunities to employ new mechanisms that natively support such dynamic and flexible workload provisioning and improve overall UE mobility.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Overview

Figure 1:
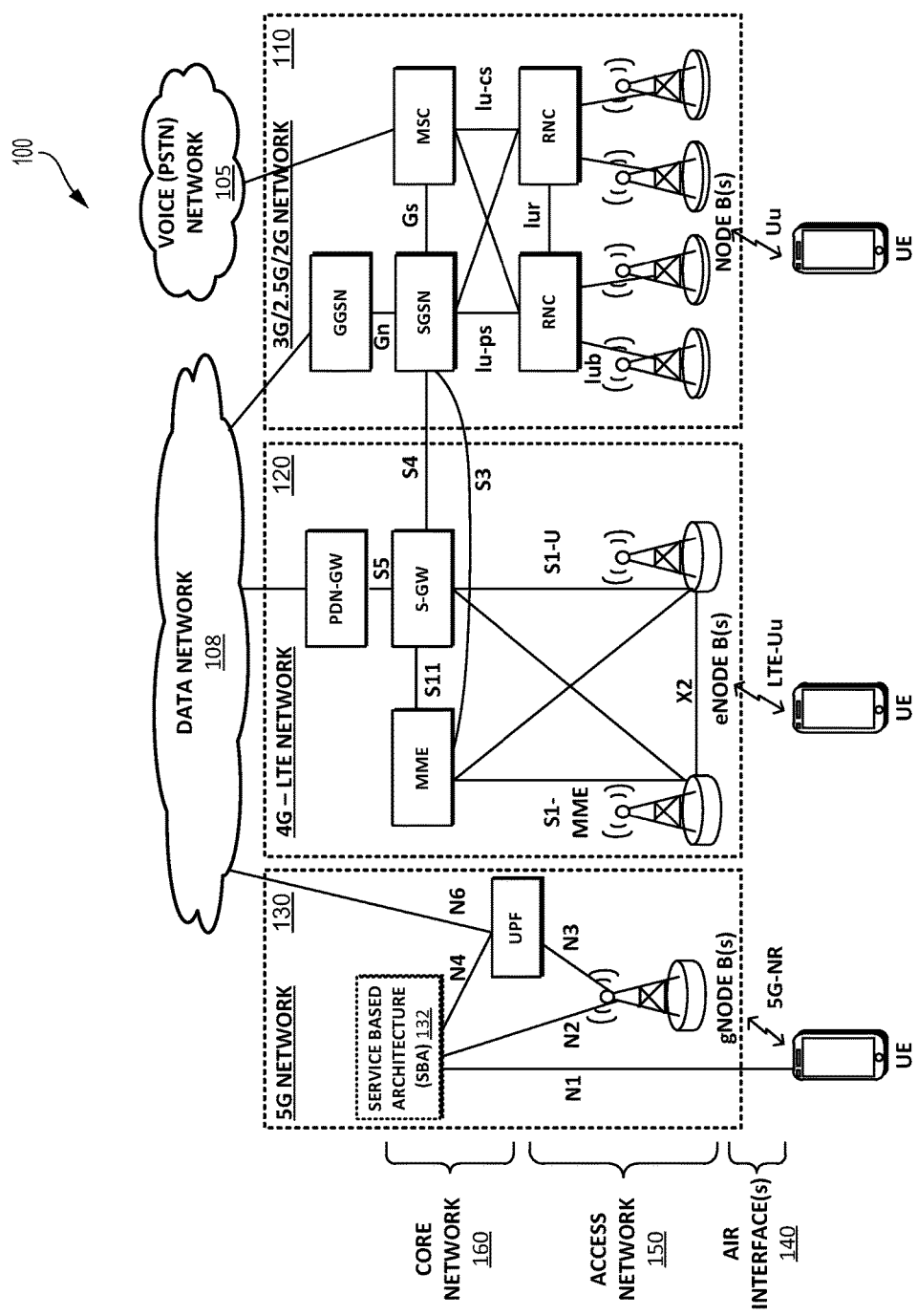
FIG. 1 illustrates a block diagram of an example telecommunications networks, including a 3G network, a 4G network, and a 5G network.

This disclosure describes techniques for communicating UE location information to a data network (DN) and for optimizing delivery of applications via the DN based on the same. User Equipment location reporting can be performed by encapsulating location information, such as a Tracking Area Identifier (TAI) or a Presence Reporting Area (PRA) ID, in SRv6 headers for packets transmitted to the AF. In response, the AF can perform steps for optimizing application delivery to the UE, for example, by re-provisioning application delivery from a local DN or other servers/entities in closer proximity to the UE than the original DN. In some implementations, additional information, such as information identifying applications used by the UE, can be included in the packet header information. In some implementations, where location reporting is restricted, i.e., either by policy (PDU policy) or SRv6 compatibility, User Plane Function (UPF) latency information can be alternatively used to infer UE locations and to perform application re-redirection. persuade In one aspect, a process of the disclosed technology includes steps for receiving, at an intermediate-User Plane Function (I-UPF) entity, uplink data from a Radio Access Network (RAN), wherein the uplink data originated from a User Equipment (UE) device, determining, at the I-UPF entity, if sharing of location information or application information associated with the UE is restricted, and encapsulating, by the I-UPF entity, first location metadata or application metadata in an SRv6 packet if the sharing of location information or application information is not restricted. In some aspects, the process can further include steps for transmitting the SRv6 packet to an anchor-User Plane Function (A-UPF) entity, for forwarding to a Data Network (DN), wherein the SRv6 packet is configured to cause the DN to transmit a first location report to at least one Application Function (AF) entity associated with the UE device.

In some aspects, the disclosed process can further include steps for calculating, at the A-UPF entity, a location of the UE device based on a measured latency between the I-UPF entity and the A-UPF entity, if the sharing of location information or application information is restricted, generating a second location report, wherein the second location report comprises second location metadata comprising the location of the UE device, and transmitting the second location report to a Session Management Function (SMF) entity, wherein the second location report is configured to cause the SMF entity to transmit the second location report to the AF entity via a Network Exposure Function (NEF) entity.

DESCRIPTION

Various embodiments of the disclosure are discussed in detail below. While specific implementations are described in detail, it should be understood that this is done for illustration purposes only. A person skilled in the relevant art will recognize that other components and configurations may be used without departing from the spirit and scope of the disclosure.

As provided herein, this disclosure relates to communication networks (e.g., telecommunication networks), which include a number of network devices/modules/entities or "Network Function(s)" (NF(s)), which can be implemented as a network element on a dedicated hardware, as a software instance running on a dedicated hardware, and/or as a virtualized function instantiated on an appropriate platform (e.g. on a cloud infrastructure), as is appreciated by those skilled in the art. For sake of clarity, the NFs described herein are based on NFs specified by existing Technical Specifications such as the 3GPP TS 23.501, TS 23.502, TS 24.501, TS 29.509, TS 29.518, TS 33.301, TS 33.501, each of which is incorporated herein by reference to its entirety. Moreover, while some operations and functionality may be described and/or attributed to a particular NF, it is appreciated that such operations are not intended to be limited to the particular NF, but may be performed by other NFs as appropriate, particularly in view of the ongoing development and evolving nature of telecommunication networks.

A communication network is a geographically distributed collection of nodes interconnected by communication links and segments for transporting data between end nodes, such as mobile devices, computers, personal computing devices (and so on), and other devices, such as network entities, sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc. Some communication networks can include telecommunication networks, which transport data between end nodes, such as user equipment (UE), which can include mobile devices.

FIG. 1 illustrates a schematic block diagram of example telecommunication networks 100, including 3G network 110, 4G network 120, and 5G network 130. Telecommunication networks 100 include wireless network interfaces or communication links, such as air interfaces 140, an access network 150, which represents radio infrastructure or radio towers, and a core network 160, which represents respective core network entities, network modules, or Network Functions (NFs). Wireless network interfaces or air interfaces 140 include Uu links for 3G network 110, LTE-Uu links for 4G network 120, and 5G-NR links for 5G network 130. In addition, other network interfaces (e.g., Nx, Sx, Lu-x, Gx, etc.) generally interconnect certain nodes (e.g., UE and/or core network entities) with other nodes (e.g., other UE and/or core network entities) based on, for example, distance, signal strength, network topology, current operational status, location, etc. As is appreciated by those skilled in the art, the network interfaces are vehicles for exchanging data packets (e.g., traffic and/or messages) between the nodes using predefined network protocols such as known wired protocols as appropriate. In this context, a protocol consists of a set of rules defining how the nodes interact with each other.

Those skilled in the art will understand that any number of nodes, devices, communication links, and the like may be used. Additionally, the examples described and illustrated herein are intended to provide examples of the disclosed technology, and are not intended to convey every implementation or implementation context in which the disclosed technology may be practiced. In particular, the representations of telecommunication networks 100, including respective interconnected network entities, are illustrated and described for purposes of discussion, not limitation, and it is appreciated that the illustrated networks can support inter-network operability/compatibility, and can include (or exclude) any number of network entities, communication links, and the like.

Access network 150 represents the infrastructure or radio towers, such as a Radio Access Network (RAN), for receiving and transmitting data packets between end user nodes (UE) as well as the various network entities (e.g., core network entities). Access network 150 includes NodeBs (NBs) for 3G network 110, eNodeBs (eNBs) for 4G network 120, and gNodeBs (gNBs) for 5G network 130. The infrastructure for each network may support different functionality and it is appreciated that infrastructure illustrated within one network can include appropriate hardware/software to support functionality of other telecommunication networks.

Respective network entities that form core network 160 (within the telecommunication networks 100) operatively connect respective RAN infrastructure (NBs, eNBs, gNBs) to third party networks such as a voice network 105 (e.g., a Public Switched Telephone Network (PSTN) network) and/or a data network (DN) 108 to create end-to-end connections. Prior to 3G (e.g., 2G, 2.5G, etc.) the third party network primarily included a voice network/PSTN 105 (e.g., a circuit switched network). From 3G onward, the third party network transitioned to include a public network (e.g., the Internet), represented by data network 108 (e.g., a packet switched network). Core network 160 and its respective network entities collectively operate to manage connections, bandwidth, and mobility for respective UE.

Notably, core network 160 evolved along three functional planes, including service management, session management, and mobility management. Service management for 2G and 3G networks includes operations to create an Integrated Services Digital Network (ISDN) over wireless links (e.g., Uu links). Session management for 3G and 4G networks generally include operations establish, maintain, and release network resources (e.g., data connections). In particular, in 3G network 110, session management includes a standalone General Packet Radio Service (GPRS) network, while 4G network 120 introduced a fully integrated data only network optimized for mobile broadband (where basic telephone operations are supported as one profile). Mobility management generally includes operations that support movement of UE in a mobile network, such as system registration, location tracking and handover (e.g., often optimized reduce heavy signaling loads). For example, in the context of 4G network 120, a Serving Gateway (SGW) and a Packet Data Gateway (PGW) support session management operations while mobility management operations (which maintains data sessions for mobile UE) are centralized within a Mobility Management Entity (MME).

The 5G network 130 introduces a 5G core architecture 132 that redistributes functionality of 4G network entities into smaller service-based functions/network entities. In addition, packet routing and forwarding functions (which are performed by SGW and PGW in 4G network 120) are realized as services rendered through a new network entity called the User Plane Function (UPF) entity. In this fashion, 5G network 130 provides a modular set of services that support dynamic and scalable deployment of resources to satisfy diverse user demands.

Figure 2:
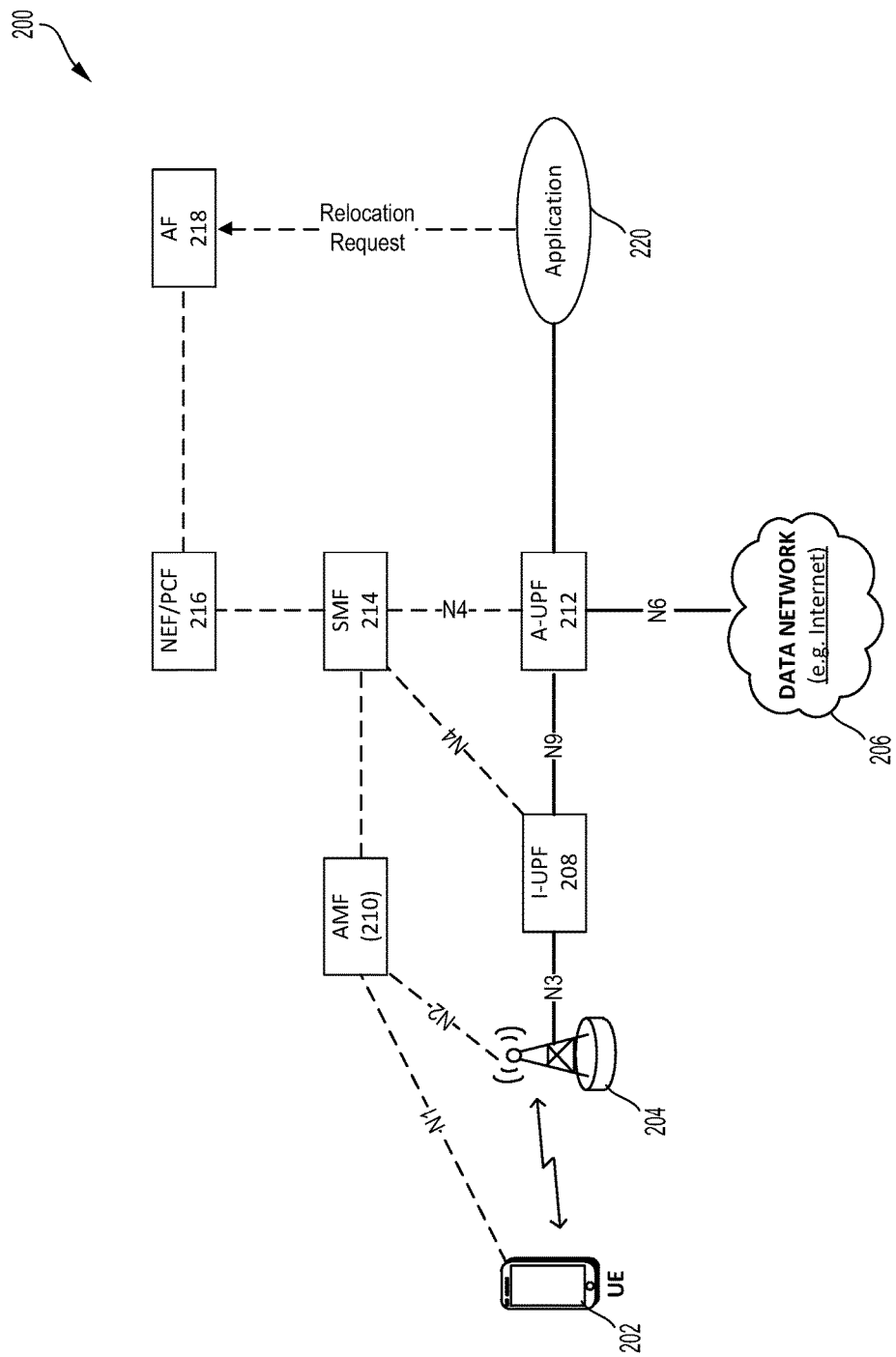
FIG. 2 illustrates an example of 5G network architecture components used to facilitate a UE location reporting and application redirect process of the disclosed technology.

FIG. 2 illustrates an example environment 200 consisting of various 5G core network components that can be used to implement location reporting and application redirection features of the disclosed technology. It is understood that environment 200 illustrates a simplified diagram of example 5G core components and is not intended to represent all network entities or modules that may be implemented.

Environment 200 includes User Equipment (UE) device 202, Radio Access Network (RAN) 204, and a variety of 5G network entities that connect UE device 202 to data network (DN) 206. The 5G entities include an intermediary-User Plane Function (I-UPF) entity 208 that is coupled to RAN 204, and an Application Management Function (AMF) entity 210, that is coupled to UE device 202 and RAN 204. 5G environment 200 further includes an anchor-UPF (A-UPF) 212 that is coupled to DN 206, as well as a Session Management Function (SMF) 214, Network Exposure Function/Policy Control Function (NEF/PCF) 216, and an Application Function (AF) 218 responsible for management of application 220. For simplicity, the NEF and PCF entities are illustrated as a single combined network entity, i.e., NEF/PCF entity 216; however, it is understood that such functions may be divided, or combined, with other network entities, depending on the desired implementation. Additionally, each entity can be implemented either as a network element on dedicated hardware, as a software instance running on dedicated hardware, or as a virtualized function instantiated on an appropriate platform, e.g., a cloud infrastructure, as is appreciated by those skilled in the art.

In the illustrated 5G network configuration, UE 202 connects to RAN 204 as well as AMF 210 over respective network interfaces. Specifically, UE 202 is coupled to AMF 210 via an N1 interface, and RAN 204 is coupled to AMF 210 via an N2 interface. AMF 210 provides UE-based authentication, authorization, and mobility management, etc. Notably, AMF 210 represents a common entity logically associated with all network slice instances that serve UE 202.

SMF 214 is responsible for session management, IP address allocation to UE(s), and traffic management/selection of the UPFs, e.g., I-UPF 208 and A-UPF 212, for proper routing/data transfer. If UE 202 has multiple sessions, different SMFs can be allocated to each session for individual management and/or different functionality per session. In some implementations, AMF 210 can discover SMF 214 based on session request data from UE 202.

The network exposure function entity portion of NEF/PCF entity 216 supports the exposure of capabilities and events, and performs operations necessary to ensure the secure provisioning of information from external applications to the 5G network, as well as translation of internal/external information. For example NEF provides a means for the application functions to securely provide information to the 5G network. In particular, NEF handles the masking of network and user sensitive information to external AF's according to network policies, for example, that are supplied by the policy control function entity portion of NEF/PCF entity 216.

AF 218 generally provides information on packet flows to PCF as part of PCF/NEF entity 216, which is responsible for policy control in order to support Quality of Service (QoS). PCF 216 determines policies about mobility and session management for proper AMF/SMF operations based on the information from AF 218.

Because of the mobile and dynamic nature of UE device operation and application provisioning, UE traffic latency can be reduced by sourcing application flows from servers proximate to the associated UE devices. Successful location-based application provisioning therefore depends on the location of the UE device (e.g., UE location information), as well as information regarding UE application types (e.g., application information) and the DN locations provisioned to serve requested application services and/or data.

Aspects of the instant disclosure provide solutions for providing UE location and/or application information to various entities in the 5G network that are necessary to facilitate location-based application provisioning. Awareness of UE location information and/or application information can be used to ensure that UE (e.g., UE device 202) content access requests are directed to local DNs, and provide the ability for application relocation to be performed by the AF (e.g., AF 218).

Environment 200 illustrates an example of 5G core infrastructure components that can facilitate location-based application provisioning. As such, UE requests can be processed at the network edge, e.g., in Mobile Edge Computing locations, rather forcing UE application access at remote DN locations, for example, as determined by a DNS returned IP address. Location based application management depends on UE location. However, to perform location based application sourcing, the corresponding applications need to know how to redirect traffic to the MEC's N6 applications. That is, the AF needs to be provided with UE device location information and/or application information so that local DNs can be selected for application delivery or application redirection/provisioning.

As discussed in further detail below with respect to the example process described in FIG. 3, and the signaling diagram of FIG. 4, UE location information and/or application information can be used to cause application redirection by a DN. For example, by communicating UE location information and/or application information to an AF associated with applications utilized by the UE, application redirection can cause subsequent UE requests to be serviced by a proximately located DN, such as a local server, to reduce traffic latency.

In some implementations, UE locations are communicated to DN and subsequently AF entities by encapsulating location and/or application metadata into packet headers. As used herein, location information/metadata can refer to any information that can be used to directly indicate or indirectly infer UE device locations. By way of example, location information can include information about the RAN, such as a Tracking Area Identifier (TAI), or a Presence Reporting Area (PRA) identifier (ID) indicating the geographic vicinity of a corresponding UE device. Application information/metadata can refer to any information that identifies applications currently running, or likely to be run by the UE device.

Depending on the desired implementation location and/or application information encapsulation can be performed by different network entities, such as at the user device e.g., UE 202, at the radio network, e.g., RAN 204 or at one or more User Plane Function Entities such as I-UPF 208 or A-UPF 212, discussed above. Location information and/or application information embedded in the packets is then provided to the DN 206 that is associated with an AF entity 218 that provides an application 220 used by UE device 202. Location and/or application information is provided to the receiving DN and AF entities using encapsulated SRv6 packet headers.

In an alternative aspect, where UE location information cannot be reported, either due to limitations on SRv6 packet transport or policy limitations, location reports may be generated based on latency information between User Plane Function entities. For example, traffic latency between various UPF entities can be measured (e.g., on an N9 interface), and used by the AF entity to determine if application relocation should be performed. Various aspects of location/application reporting are described in greater detail with respect to the process illustrated by FIG. 3, and the communication diagram of FIG. 4.

Figure 3:
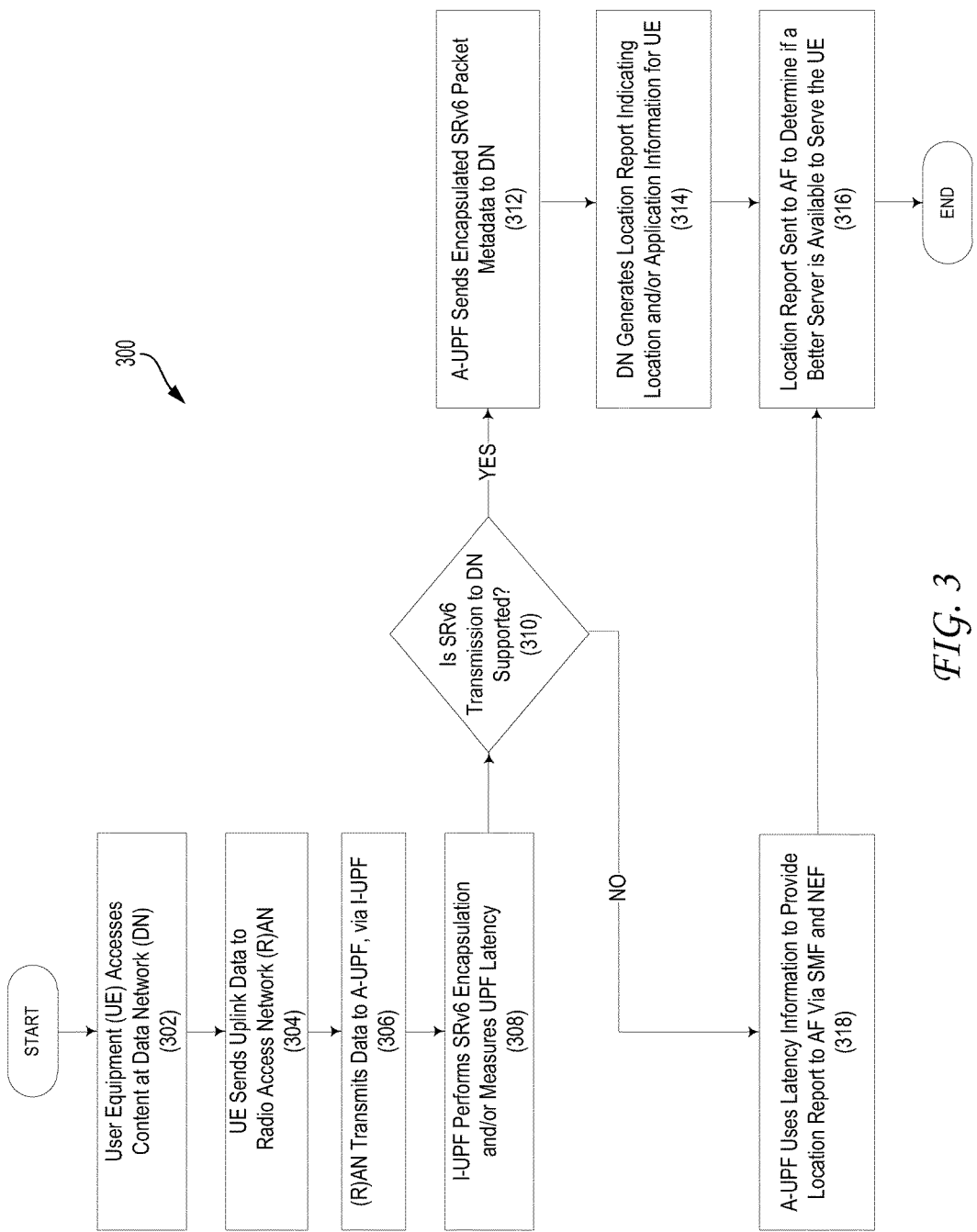
FIG. 3 illustrates a flow chart of an example process for implementing location reporting and application re-routing, according to some aspects of the disclosed technology.

Turning now to FIG. 3, which illustrates an example process 300 for implementing location-based application redirection in a 5G network. Process 300 begins when a content request is transmitted from a UE device (e.g., UE device 202) to a Domain Name System (DNS) server, which returns an IP address for an initial DN capable of servicing the request (step 302). In some instances, one or more applications of the UE can use the IP address for connecting to and receiving content from the initial DN.

Once the initial DN has been contacted by the UE, subsequent uplink data is transmitted from the UE via the associated Radio Access Network, e.g., RAN 204, discussed above with respect to FIG. 2 (step 304). In some aspects, encapsulation may be performed by the RAN, for example, by inserting location/application information into the uplink data packets received from the UE. In alternative aspects, location/application encapsulation is performed upstream by the I-UPF and/or A-UPF.

Uplink data received by the RAN is then transmitted to the I-UPF entity (step 306), for example, over an N3 interface. RAN uplink transmissions to the I-UPF entity can be performed using a GPRS Tunnelling Protocol (GTP). The I-UPF entity can then pass the uplink data onto the A-UPF entity, for example, via an N9 interface.

In instances where encapsulation is not performed by the RAN (see step 304, above), then the I-UPF entity can encapsulate the uplink packets with location information and/or application information of the UE device. Location information can include one or more of a Tracking Area Identifier (TAI) and/or a Presence Reporting Area identifier (PRA ID). Application information can include a list of applications currently running or in use by the UE. In some aspects, application information may include information identifying applications that have been previously run on the UE, for example, that may be used to make inferences regarding application access requests the UE is likely to make at some future time. In another embodiment, local DNs may register their application IDs with nearby UPF entities. In such instances, application information may identify one or more available applications on the respective UPF entity's N6 interfaces, e.g., as an application list.

As discussed above, packet encapsulation can be performed by encapsulating the received datagram of uplink packets into one or more SRv6 packets. In some approaches, the A-UPF entity performs encapsulation by inserting the TAI/PRA ID information into a segment routing header (SRH) segment identifier (SID), of the corresponding SRv6 packet/s. Application information can also be encapsulated, identifying UE applications and/or UPF registered applications available from one or more local DNs. In some aspects, other network information may also be encapsulated, such as data identifying Quality of Service (QoS), and other network policy information.

It is understood that encapsulation of location and/or application information pertaining to any UE device on the network can be performed on a per-UE basis, a per-application basis, a per-location basis, and/or a combination thereof.

In some aspects, the I-UPF entity may also take latency measurements, i.e., to determine a latency for UE uplink data when transmitted between UE entities. For example, the I-UPF entity may use N9 latency measurements to make inferences about UE location or distance that can be used to perform location-based application redirection, as discussed in further detail below.

In some network deployments, SRv6 transmissions can be limited due to UPF entity SRv6 traffic handling capabilities and/or due to policies set by the UE and/or various applications. For example, policies (e.g., PDU or network policies) can limit or prevent device location reporting. As such, determinations can be made as to whether location/application information can be encapsulated in SRv6 headers (step 310).

If it is determined that location/application information reporting is not restricted, the A-UPF transmits the encapsulated SRv6 packet metadata to the DN (step 312). Subsequently, the DN generates a location report indicating location and/or application information for the respective UE device (step 314). The location report is then sent to the AF (step 316). The location report provides information required for the AF to determine if a better server is available to provide one or more applications used by the UE. That is, the AF identifies application servers deployed near the UE so that the DN can optimize/redirect application traffic to the UE from a proximate server. If the AF identifies a proximate application server, then the DNS is updated so that subsequent application requests are directed to the local DN/server.

In some implementations, the AF may provision a server of a local DN by moving an application. For example, the DN can use the new server information received from the AF or application content delivery network policy (CDN) to redirect the application to the local DN's server. Thus, application provisioning can be performed by the AF in response to changes in location and/or application information reported by the UE.

If in step 310 it is determined that location reporting is not permitted, either due to limitations on SRv6 traffic handling, or due to policy restrictions, then process 300 proceeds to step 318. Location information received by the A-UPF entity (e.g., on the N9 interface), is reported to the AF via the Session management Function (SMF) entity and the Network Exposure Function (NEF) entity (step 318). Location information based on N9 latency measurements can be provided to the AF in addition to 3GPP specific TAI information that can be received, for example, over a Service Based Interface (SBA), such as an N11 interface. Once the location report is provided by the NEF entity to the AF, process 300 can revert to step 316, as discussed above.

Figure 4:
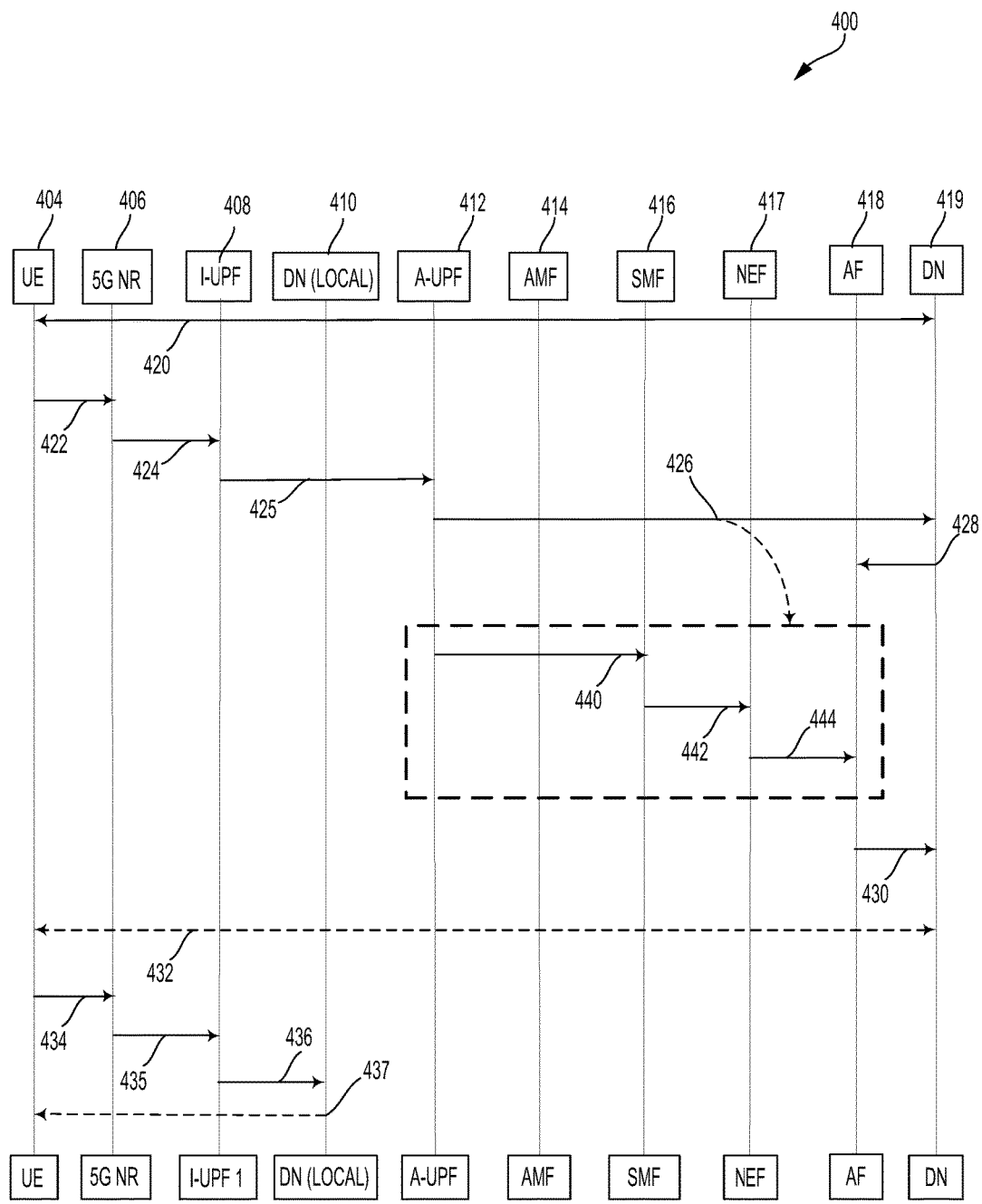
FIG. 4 illustrates a signalling diagram for implementing a location reporting and application redirect process, according to some aspects of the disclosed technology.

FIG. 4 illustrates an example signal diagram 400 for implementing a location-based application redirection process of the disclosed technology. In particular, signalling diagram 400 illustrates communications between various network entities that can be configured to implement location-based application provisioning in a 5G network. The variously illustrated network entities include a UE device 404, a 5G new radio entity (5G NR) 406, intermediate-UPF (I-UPF) 408, a local data network (DN local) 410, anchor-UPF (A-UPF) 412, AMF entity 412, SMF entity 416, NEF entity 417, AF entity 418, and data network (remote) 419. As would be understood by those of skill in the art, the illustrated network entities provide examples of various network architecture components that can be used to facilitate the location based application provisioning process described herein. However, it is understood that a greater (or fewer) number of entities may be deployed to practice the disclosed technology.

The communication process illustrated in signal diagram 400 begins with step 420 in which the UE device 404 requests content access from a (remote) data network (DN 419). The ability of UE device 404 to access content on DN 419 follows a lookup response/request communication to a DNS server (not illustrated), in which the IP address of DN 419 is returned to UE 404.

Next, UE device 404 sends uplink data to the radio access network, i.e., 5G NR 406 (signal 422). As discussed above, the SRv6 encapsulation process can optionally be performed by 5G NR device 406, i.e., to insert location/application information pertaining to UE device 404 into the uplink data. Alternatively, the uplink data may be left un-encapsulated, and transmitted by 5G NR device 406 to I-UPF entity 408 wherein encapsulation is performed (signal 424).

In such embodiments, I-UPF entity 408 encapsulates the uplink datagram as a SRv6 packet in which location information and/or application information for UE device 404 is included in a segment routing header segment identifier (SRH SID). Although the location information can include any type of information identifying the UE device position, in some aspects the location information can include one or more of a Tracking Area Identifier (TAI) and/or a Presence Reporting Area identifier (PRA ID), as discussed above. Additionally, other information may be encapsulated, such as information identifying one or more applications running on UE device 404 and/or information regarding Quality of Service (QoS) and/or other policies that are in effect for the UE device (collectively application information).

Once the location/application information is encapsulated by I-UPF 408, the SRv6 uplink packet/s are sent to A-UPF entity 412 (signal 425). Subsequently, A-UPF entity 412 passes the SRv6 uplink data to DN 419 (signal 426). Based on the charging action rule, traffic transmitted by A-UPF entity 412 to DN 419 can be used by DN 419 to trigger network changes. As discussed above, for example, DN 419 can provide a location report to one or more application functions, e.g., AF 418, for example, to cause changes in an application accessed by UE device 404 (signal 428).

In alternative embodiments, where SRv6 location reporting is not permitted, for example, either because the DN application server does not permit SRv6, or because location reporting is restricted by network policy (e.g., a PDU policy), then A-UPF 412 cannot communicate UE location directly to DN 419 in signal 426. Alternatively, A-UPF 412 reports traffic latency information from received from its N9 interface to SMF 416, to permit the SMF to take action (signal 440). In some aspects, latency between UPF entities, e.g., between I-UPF 408 and A-UPF 412 can be used to infer UE device 404 locations in the network. SMF 416 then reports the location directly to NEF entity 417 (signal 442), which in turn provides a location report directly to AF 418 (signal 444).

Once a location report is received at AF 418, either as an SRv6 notification received from DN 419 (signal 428), or as a location report received directly from NEF 417 (signal 444), then AF 418 can take determine what application servers are locally available to UE device 404 e.g., from a local DN, such as DN (local) 410. As discussed above, the AF may implement necessary network changes to ensure that additional applications requests are received at DN that is local to UE device 404, e.g., DN 410. In other aspects, the AF may cause network changes necessary to redirect an application by deploying an instance of the application at a local server where it did not previously exist.

Specifically, to perform application redirection, AF 418 can update a DNS address (in DN 419) to redirect application traffic to a closer server (signal 430). Successive application requests from UE device 404 are then directed to local DN/server 410 using the updated IP address (signal 432). For example, an uplink request from UE device 404 would first be communicated to 5G NR 406 (signal 434), and the passed by 5G NR 406 to I-UPF 408 (signal 435), before transmission to the local DN 410 (signal 436). The requested content would then be transmitted from the local DN 410 back to UE device 404 in reply (signal 437).

Figure 5:
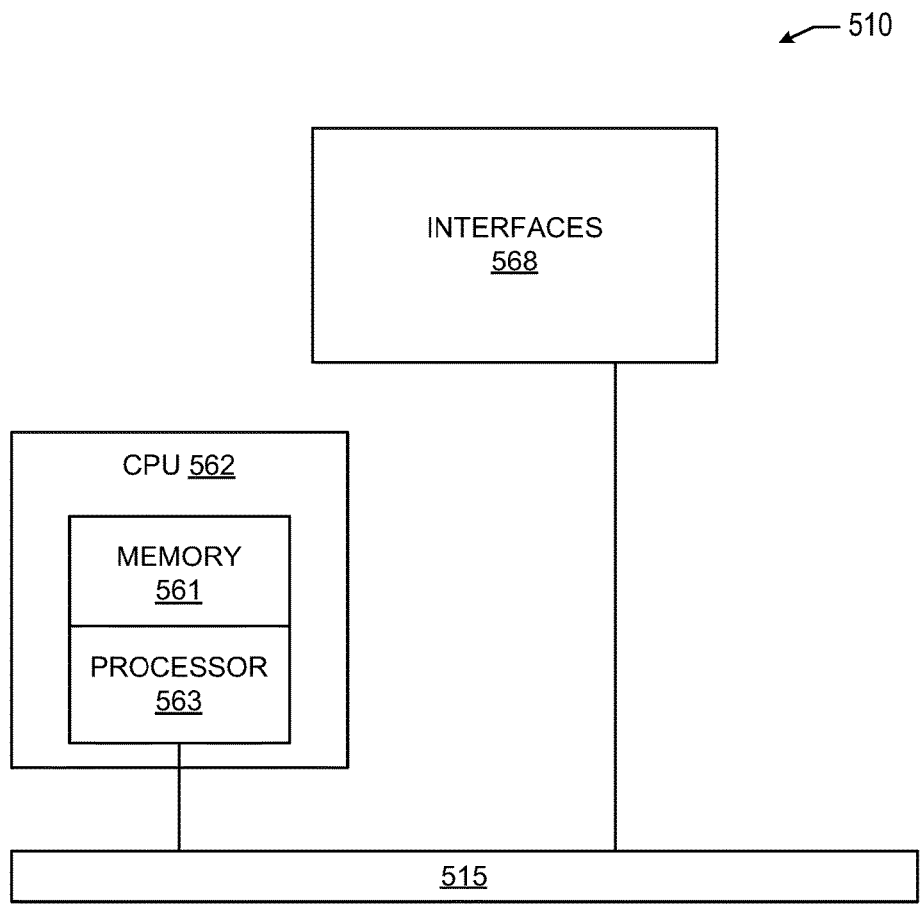
FIG. 5 illustrates a block diagram of hardware components that can be used to implement various network devices, such as User Equipment (UE) devices, and/or various other 5G core architecture components and entities, for example, as illustrated in FIG. 2.

FIG. 5 illustrates a block diagram of hardware components that can be used to implement various network devices, such as User Equipment (UE) devices, and/or various other 5G core architecture components and entities, for example, as illustrated in FIG. 2.

Device 510 includes central processing unit (CPU) 562, network interfaces 568, and a bus 515 (e.g., a PCI bus). When acting under the control of appropriate software or firmware, the CPU 562 is responsible for executing a method for conveying User Equipment (UE) information to an Application Function (AF), the method including steps for receiving, at an intermediate-User Plane Function (I-UPF) entity, User Equipment (UE) uplink data from a Radio Access Network (RAN), wherein the UE uplink data originated from a User Equipment (UE) device, determining, at the I-UPF entity, if sharing of location information or application information associated with the UE is restricted, and encapsulating, by the I-UPF entity, first location metadata or application metadata in an SRv6 packet if the sharing of location information or application information is not restricted. In some aspects, the steps can further include transmitting the SRv6 packet to an anchor-User Plane Function (A-UPF) entity for forwarding to a Data Network (DN), wherein the SRv6 packet is configured to cause the DN to transmit a first location report to at least one Application Function (AF) entity associated with an application associated with the UE device.

In some instances, the first location metadata includes one or more of: a Tracking Area Identifier (TAI) or a Presence Reporting Area (PRA).

In some instances, the application metadata comprises a list of one or more applications associated with the UE device.

In some instances, the first location report is configured to cause the AF to re-provision at least one application to a server proximate to the UE device.

In some instances the steps of the disclosed method can further include: calculating, at the A-UPF entity, a location of the UE device based on a measured latency between the I-UPF entity and the A-UPF entity, if the sharing of location information or application information is restricted, generating a second location report, wherein the second location report comprises second location metadata comprising the location of the UE device, transmitting the second location report to a Session Management Function (SMF) entity, wherein the second location report is configured to cause the SMF entity to transmit the second location report to the AF entity via a Network Exposure Function (NEF) entity.

CPU 562 can accomplish all these functions under the control of software including an operating system and any appropriate applications software. CPU 562 may include one or more processors 563, such as a processor from the INTEL X86 family of microprocessors. In some cases, processors 563 can be specially designed hardware for controlling the operations of network device 510. In some cases a computer-readable memory, e.g., memory 461 (a non-volatile Random Access Memory (RAM), or a Read Only Memory (ROM), etc., also forms part of CPU 562. However, there are many different ways in which memory could be coupled to the system.

Interfaces 568 can be provided as modular interface cards (sometimes referred to as "line cards"). They can control the sending and receiving of data packets over the network and sometimes support other peripherals used with network device 510. Among the interfaces that may be provided are Ethernet interfaces, frame relay interfaces, cable interfaces, Digital Subscriber Line (DSL) interfaces, token ring interfaces, and the like.

In addition, various very high-speed interfaces may be provided such as fast token ring interfaces, wireless interfaces, Ethernet interfaces, Gigabit Ethernet interfaces, ATM interfaces, High Speed Serial Interfaces (HSSIs), POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 563 to efficiently perform routing computations, network diagnostics, security functions, etc.

Although the system shown in FIG. 5 is one specific network device of the disclosed embodiments, it is by no means the only network device architecture on which aspects of the disclosed technology can be implemented. For example, an architecture having a single processor that handles communications as well as routing computations, etc., is often used. Further, other types of interfaces and media could also be used with the network device 510.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 561 could also hold various software containers and virtualized execution environments and data.

In some implementations, the program instructions may be configured to cause CPU 562 and/or processor/s 563 to perform operations for implementing Network device 510 can also include an application-specific integrated circuit (ASIC), which can be configured to perform any of the operations described above. The ASIC can communicate with other components in the network device 510 via bus 515, to exchange data and signals and coordinate various types of operations by network device 510, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from non-transitory forms of computer-readable media. Such instructions can comprise, for example, instructions and data which cause or otherwise configure a general purpose computer, special purpose computer, or special purpose processing device to perform a certain function or group of functions.

Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The foregoing description has been directed to specific embodiments. It will be apparent, however, that other variations and modifications may be made to the described embodiments, with the attainment of some or all of their advantages. For instance, it is expressly contemplated that the components, elements, and/or operations described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network.

The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method for conveying User Equipment (UE) information to an Application Function (AF), the method comprising:
   receiving, at an intermediate-User Plane Function (I-UPF) entity, User Equipment (UE) uplink data from a Radio Access Network (RAN), wherein the UE uplink data originated from a User Equipment (UE) device;
   determining, at the I-UPF entity, if sharing of location information or application information associated with the UE is restricted;
   encapsulating, by the I-UPF entity, first location metadata or application metadata in an SRv6 packet if the sharing of location information or application information is not restricted; and
   transmitting the SRv6 packet to an anchor-User Plane Function (A-UPF) entity for forwarding to a Data Network (DN), wherein the SRv6 packet is configured to cause the DN to transmit a first location report to at least one Application Function (AF) entity associated with an application associated with the UE device.

2. The method of claim 1, wherein the first location metadata comprises one or more of: a Tracking Area Identifier (TAI) or a Presence Reporting Area (PRA).

3. The method of claim 1, wherein the application metadata comprises a list of one or more applications associated with the UE device.

4. The method of claim 1, wherein the first location report is configured to cause the AF to re-provision at least one application to a server proximate to the UE device.

5. The method of claim 1, further comprising:
   calculating, at the A-UPF entity, a location of the UE device based on a measured latency between the I-UPF entity and the A-UPF entity, if the sharing of location information or application information is restricted;
   generating a second location report, wherein the second location report comprises second location metadata comprising the location of the UE device; and
   transmitting the second location report to a Session Management Function (SMF) entity, wherein the second location report is configured to cause the SMF entity to transmit the second location report to the AF entity via a Network Exposure Function (NEF) entity.

6. The method of claim 5, wherein the sharing of location information or application information is restricted by network policy.

7. The method of claim 5, wherein the sharing of location information or application information is restricted by the AF entity.

8. An intermediate-User Plane Function (I-UPF) entity comprising:
   one or more network interfaces configured to communicate with a communication network;
   one or more processors coupled to the network interfaces and adapted to execute one or more processes; and
   a memory coupled to the one or more processors, wherein the memory is configured to store instructions executable by the one or more processors, and wherein the instructions are configured to execute operations comprising:
      receiving User Equipment (UE) uplink data from a Radio Access Network (RAN), wherein the UE uplink data originated from a User Equipment (UE) device;
      determining if sharing of location information or application information associated with the UE is restricted; and
      encapsulating first location metadata or application metadata in an SRv6 packet if the sharing of location information or application information is not restricted; and
      transmitting the SRv6 packet to a Data Network (DN), wherein the SRv6 packet is configured to cause the DN to transmit a first location report to at least one Application Function (AF) entity associated with an application associated with the UE device.

9. The I-UPF entity of claim 8, wherein the first location metadata comprises one or more of: a Tracking Area Identifier (TAI) or a Presence Reporting Area (PRA) identifier.

10. The I-UPF entity of claim 8, wherein the application metadata comprises a list of one or more applications associated with the UE device.

11. The I-UPF entity of claim 8, wherein the first location report is configured to cause the AF to re-provision at least one application to a server proximate to the UE device.

12. The I-UPF entity of claim 8, further comprising:
   an anchor-User Plane Function (A-UPF) entity, wherein the A-UPF is configured to communicate with the I-UPF entity, and wherein the A-UPF entity is configured to perform operations comprising:
      calculating a location of the UE device based on a measured latency between the I-UPF entity and the A-UPF entity, if the sharing of location information or application information is restricted;

generating a second location report, wherein the second location report comprises second location metadata comprising the location of the UE device; and transmitting the second location report to a Session Management Function (SMF) entity, wherein the second location report is configured to cause the SMF entity to transmit the second location report to the AF entity via a Network Exposure Function (NEF) entity.

13. The I-UPF entity claim 12, wherein the sharing of location information or application information is restricted by network policy.

14. The I-UPF entity claim 12, wherein the sharing of location information or application information is restricted by the AF entity.

15. A non-transitory computer-readable storage medium comprising instructions stored therein, which when executed by one or more processors, cause the processors to perform operations comprising:

receiving, at an intermediate-User Plane Function (I-UPF) entity, User Equipment (UE) uplink data from a Radio Access Network (RAN), wherein the UE uplink data originated from a User Equipment (UE) device;

determining, at the I-UPF entity, if sharing of location information or application information associated with the UE is restricted;

encapsulating, by the I-UPF entity, first location metadata or application metadata in an SRv6 packet if the sharing of location information or application information is not restricted; and transmitting the SRv6 packet to an anchor-User Plane Function (A-UPF) entity for forwarding to a Data Network (DN), wherein the SRv6 packet is configured to cause the DN to transmit a first location report to at least one Application Function (AF) entity associated with an application associated with the UE device.

16. The non-transitory computer-readable storage medium of claim 15, wherein the first location metadata comprises one or more of: a Tracking Area Identifier (TAI) or a Presence Reporting Area (PRA).

17. The non-transitory computer-readable storage medium of claim 15, wherein the application metadata comprises a list of one or more applications associated with the UE device.

18. The non-transitory computer-readable storage medium of claim 15, wherein the first location report is configured to cause the AF to re-provision at least one application to a server proximate to the UE device.

19. The non-transitory computer-readable storage medium of claim 15, wherein the instructions are further configured to perform operations comprising:

calculating, at the A-UPF entity, a location of the UE device based on a measured latency between the I-UPF entity and the A-UPF entity, if the sharing of location information or application information is restricted;

generating a second location report, wherein the second location report comprises second location metadata comprising the location of the UE device; and transmitting the second location report to a Session Management Function (SMF) entity, wherein the second location report is configured to cause the SMF entity to transmit the second location report to the AF entity via a Network Exposure Function (NEF) entity.

20. The non-transitory computer-readable storage medium of claim 19, wherein the sharing of location information or application information is restricted by network policy.

* * * * *